United States Patent
Tyren

Patent Number: 5,760,580
Date of Patent: Jun. 2, 1998

[54] METHOD FOR EXCITATION AND DETECTION OF MAGNETIC ELEMENTS BY A MECHANICAL RESONANCE

[75] Inventor: Carl Tyren, Antibes, France

[73] Assignee: RSO Corporation N.V., Curacao AN, Netherlands

[21] Appl. No.: 732,485

[22] PCT Filed: Apr. 25, 1995

[86] PCT No.: PCT/SE95/00451

§ 371 Date: Dec. 16, 1996

§ 102(e) Date: Dec. 16, 1996

[87] PCT Pub. No.: WO95/29466

PCT Pub. Date: Nov. 2, 1995

[30] Foreign Application Priority Data

Apr. 26, 1994 [SE] Sweden ............ 9401448

[51] Int. Cl.⁶ ............ G08B 13/24; G08B 13/18; G01R 33/12
[52] U.S. Cl. ............ 324/239; 324/232; 340/551; 340/572
[58] Field of Search ............ 324/239, 243, 324/232, 207.13, 207.22; 340/540, 541, 551, 552, 572

[56] References Cited

U.S. PATENT DOCUMENTS

| | | |
|---|---|---|
| 4,492,922 | 1/1985 | Ohkubo. |
| 4,647,917 | 3/1987 | Anderson, III et al.. |
| 4,704,602 | 11/1987 | Asbrink. |
| 4,710,752 | 12/1987 | Cordery. |
| 5,005,001 | 4/1991 | Cordery. |
| 5,049,857 | 9/1991 | Plousky et al.. |
| 5,160,888 | 11/1992 | Laukien. |
| 5,300,922 | 4/1994 | Stoffer. |
| 5,397,986 | 3/1995 | Conway et al. ............ 324/243 |
| 5,420,569 | 5/1995 | Dames et al.. |
| 5,576,693 | 11/1996 | Tyren et al.. |
| 5,621,316 | 4/1997 | Dames et al.. |

FOREIGN PATENT DOCUMENTS

| | | |
|---|---|---|
| 96182 | 12/1993 | European Pat. Off.. |
| 21 67 627 | 5/1986 | United Kingdom. |
| WO 88/01427 | 2/1988 | WIPO. |
| WO 93/04538 | 3/1993 | WIPO. |
| WO 93/14370 | 7/1993 | WIPO. |
| WO 93/14478 | 7/1993 | WIPO. |

*Primary Examiner*—Walter E. Snow
*Attorney, Agent, or Firm*—Merchant, Gould, Smith, Edell, Welter and Schmidt

[57] ABSTRACT

A method for excitation and detection of magnetic resonance elements (10) in an interrogation zone (11), whereby a magnetic excitation signal is generated by at least one excitation means (12) and is supplied to the resonance element, so as to force the resonance element (10) into mechanical self-oscillation, and whereby a magnetical signal caused by the self-oscillation is detected. The excitation signal is generated by at least two excitation means (12) being located at a distance from each other, whereby a symmetry plane (14) for the excitation signal is obtained between the excitation means (12). The magnetic signal caused by the self-oscillation is symmetrically recorded at both sides of the symmetry plane (14), and the resonance elements are placed between an excitation means (12) and the symmetry plane (14), the recorded signal thereby containing the magnetic signal caused by the self-oscillation, but lacking the excitation signal.

2 Claims, 1 Drawing Sheet

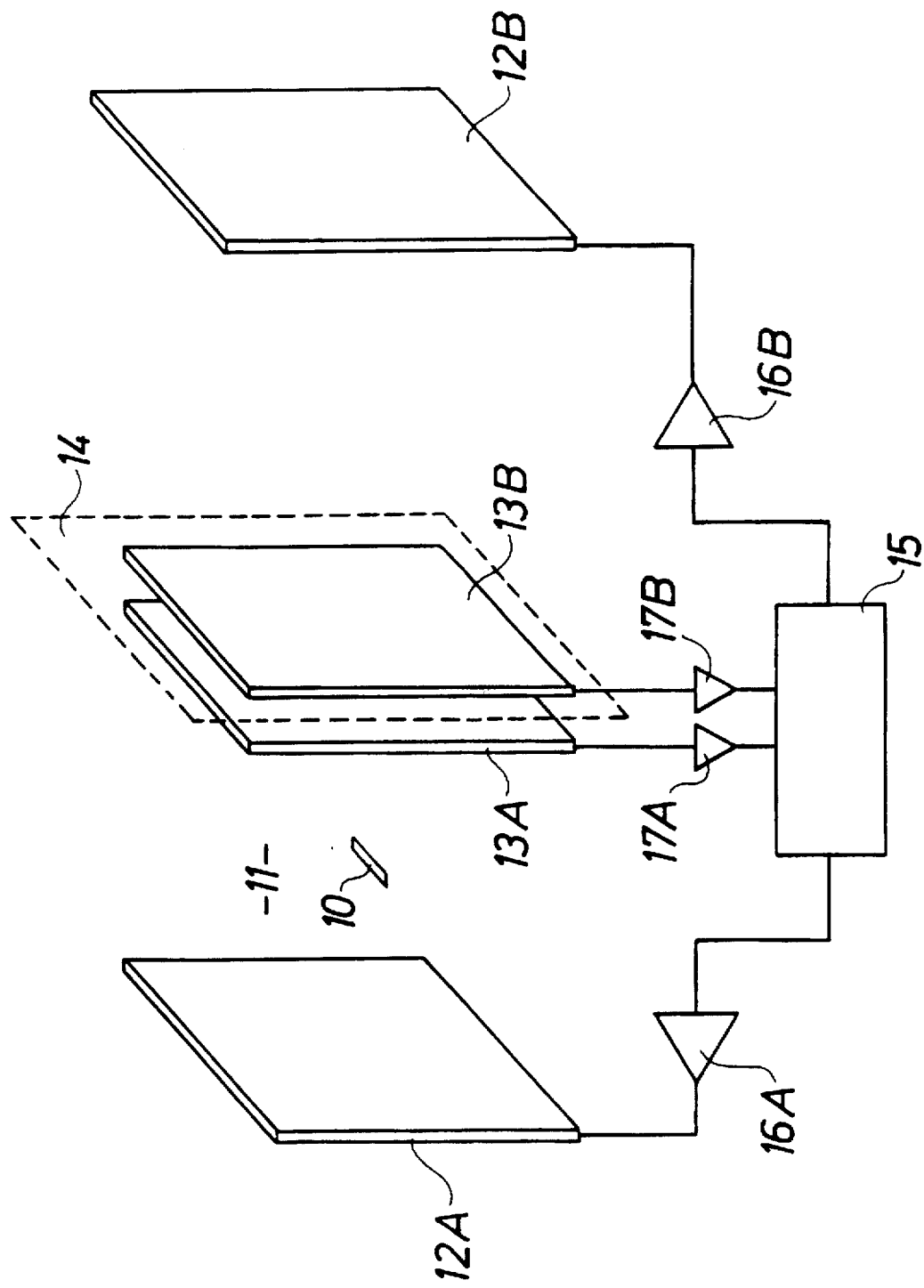

METHOD FOR EXCITATION AND DETECTION OF MAGNETIC ELEMENTS BY A MECHANICAL RESONANCE

FIELD OF THE INVENTION

Elements made of a material, the magnetic or magneto-mechanical properties of which depend on and are influenced by external magnetic field(s), may be detected by means of magnetic detection means. The magnetic and mechanical properties of such elements are changed, when the elements are exposed to a so-called bias field. A common way of obtaining a signal from a basically passive element is to excite the element to mechanical resonance. The self-oscillation of such a resonance element is magnetically detectable.

DESCRIPTION OF THE PRIOR ART

In e.g. WO 88/01427, a method and device for automatic and remote identification of objects are disclosed and described. The objects are provided with labels, comprising tapes of a material with a high magneto-mechanical coupling. The tapes are mechanically movable and are forced into mechanical self-oscillation by a magnetic signal from an excitation means.

When the magnetic signal emitted from the tapes or the resonance elements according to WO 88/01427 is going to be recorded, a problem arises. The signal from the resonance elements exists simultaneously with, or in immediate connection with, the exciting signal. Furthermore, the signals from the resonance elements have the same frequency. As a result, the normally considerably stronger excitation signal completely hides a simultaneously incoming resonance element signal, which is intended to be used for detection and which is considerably weaker.

Various systems have been suggested for the purpose of avoiding the above-mentioned problem. A common way is to excite the resonance elements at their fundamental frequency, but to detect them at a harmonic frequency. Alternatively, the excitation signal may be the total of two signals at completely different frequencies.

A drawback with the solutions described above is that harmonics are generally considerably weaker than the fundamental and that the frequency relationship between the fundamental and a harmonic is complicated, especially in the case of magneto-elastical elements.

BRIEF SUMMARY OF THE INVENTION

An object with the present invention is to substantially remove the above-mentioned problem. According to the invention, a signal from the resonance elements is detected at the same frequency as the excitation signal and in immediate connection with the emission of the excitation signal. The above is possible due to the fact that the detection signal is recorded symmetrically at both sides of a symmetry plane in an interrogation zone. Due to the fact that the excitation signal is generated by two excitation means located on different sides of the symmetry plane, the symmetrically recorded detection signal completely lacks influence from the excitation signal.

BRIEF DESCRIPTION OF THE DRAWING

The DRAWING schematically shows an arrangement for excitation and detection of magnetic resonance elements according to the invention.

DETAILED DESCRIPTION

In a preferred embodiment, two excitation means 12 are connected to an electronic controller 15 through two driver and amplifier units 16A and 16B. The excitation means 12A and 12B are realized as magnetic coils, which are parallelly and coaxially arranged with respect to each other. Consequently, a symmetry plane 14 is obtained between the excitation coils with regard to the excitation field generated by the excitation coils. If the signals from both the excitation coils are of equal strength, the symmetry plane is obtained at half the distance between the coils. Two detection means, preferably in the form of magnetic coils, are symmetrically arranged with one means at each side of the symmetry plane. The detection coils 13A and 13B are operatively connected to a central electronic controller 15. In the embodiment shown, the detection coils 13A and 13B are connected to the amplifier units 17A and 17B, respectively, which in turn are connected to the controller 15.

By the use of the arrangement according to the drawing, identical excitation signals are generated in the two excitation coils 12A and 12B by the controller 15. The signals from the two detection coils 13A and 13B are amplified in the amplifiers 17A and 17B, and a signal corresponding to the difference between the signals recorded in the detection coils is determined in the central controller 15. If all the signals are generated fully symmetrically, the detected signal should have a zero value if no resonance element is present, since the same signal is recorded in each of the two detection coils 13A and 13B.

The required symmetry does not necessarily have to be geometrical. It is also possible to accomplish the desired symmetry electronically. It is furthermore possible to use active balancing in order to compensate for e.g. errors and defects in the manufacture and/or assembly stage, displacements or the like, or other sources of a lost symmetry in the excitation signal to the detection coils. Such an active balancing may easily be accomplished, if the signal to each of the excitation coils is individually controlled. At chosen instants, the level of excitation signal in the difference signal from the detection coils may be monitored, and the excitation control may be adjusted, so that the difference signal with respect to the excitation signal becomes zero again.

It is also possible to adjust the difference signal directly to balance by means of, for instance, differential amplifiers at the detection side.

If, on the other hand, a resonance element 10 is located in an interrogation zone between an excitation coil 12A, 12B and the corresponding detection coil 13A, 13B at the same side of the symmetry plane 14, detection may be accomplished. The reason for this is that the signal generated by the resonance element has no corresponding symmetry element on the opposite side of the symmetry plane. The distance between the resonance element 10 and the detection coil 13A is different from the distance between the resonance element 10 and the other detection coil 13B, resulting in a different signal strength for the signals from each of the detection coils. The difference signal will also have a different polarity depending on whether the resonance signal originates from one or the other side of the symmetry plane. Thus, the above also facilitates a simultaneous detection of signals from each of the sides thanks to separation through the signal polarity.

In the embodiment shown, excitation and detection are only described for one coordinate axis. Preferably, additional axes are used correspondingly with different axis directions, so as to obtain an accurate detection in dependency of the orientation and position of the resonance elements. For instance, an arrangement according to the drawing may be provided for each of the x-, y-, and z-axes.

The excitation signal may be realized by a frequency sweep, comprising the resonance frequency of the resonance element. When the resonance frequency is passed, excitation and a characteristic shift in phase between the exciting signal and the detecting signal from the resonance element occur. The phase shift is 90°, but due to so-called Nykvist effects in the detection coils 13A and 13B etc., the phase shift detected by the detection circuitry is only a few degrees. Particularly if the resonance is "narrow", "phase clipping" occurs very rapidly at this steep phase transition, and accordingly it is possible to detect the signal by means of a phase derivative detector.

I claim:

1. A method for detecting a magnetic element in an interrogation zone, the magnetic or mechanical properties of the magnetic element being affectable by an external magnetic field, the method comprising:

generating an excitation signal for a first coordinate axis in the interrogation zone by at least two excitation means located at a distance from each other, so that a symmetry plane for the excitation signal is obtained between the excitation means;

placing the magnetic element between one of the at least two excitation means and the symmetry plane;

magnetically exciting a mechanical resonance in the magnetic element so as to generate a magnetic signal arising from the mechanical oscillation;

detecting the magnetic signal symmetrically at both sides of the symmetry plane by two detectors arranged at different sides of the symmetry plane; and generating a difference signal from the signals detected by the detectors;

whereby the difference signal thus generated contains a magnetic signal caused by resonance oscillation of the magnetic element, but substantially lacks a component caused by the excitation signal.

2. A method according to claim 1, further comprising continuously analyzing a signal phase of the difference signal with respect to the excitation signal having a sweeping frequency, and interpreting a rapid change of phase at a current excitation signal frequency value as indicating a presence of a magnetic element with a resonance frequency at the current frequency value of the excitation signal.

* * * * *